US011711002B2

(12) United States Patent
Zana et al.

(10) Patent No.: US 11,711,002 B2
(45) Date of Patent: Jul. 25, 2023

(54) METHOD AND DEVICE FOR SHAPING AN INDUCTANCE COIL

(71) Applicant: Gehring e-tech GmbH, Ostfildern (DE)

(72) Inventors: Giuseppe Zana, Roncadelle (IT); Fabrizio Giuradei, Lonato del Garda (IT)

(73) Assignee: Gehring e-tech GmbH, Ostfildern (DE)

( * ) Notice: Subject to any disclaimer, the term of this patent is extended or adjusted under 35 U.S.C. 154(b) by 0 days.

(21) Appl. No.: 17/253,753

(22) PCT Filed: Jun. 18, 2019

(86) PCT No.: PCT/EP2019/066032
§ 371 (c)(1),
(2) Date: Dec. 18, 2020

(87) PCT Pub. No.: WO2019/243340
PCT Pub. Date: Dec. 26, 2019

(65) Prior Publication Data
US 2021/0273536 A1    Sep. 2, 2021

(30) Foreign Application Priority Data

Jun. 18, 2018 (DE) .................... 10 2018 114 580.2

(51) Int. Cl.
*H02K 15/04* (2006.01)
*H02K 15/06* (2006.01)
(52) U.S. Cl.
CPC ....... *H02K 15/0421* (2013.01); *H02K 15/064* (2013.01)

(58) Field of Classification Search
CPC .............................. H02K 15/0421; B21D 7/04
See application file for complete search history.

(56) References Cited

U.S. PATENT DOCUMENTS

| 4,391,116 A * | 7/1983 | Yogo ........................ B21D 7/08 |
| | | 72/166 |
| 5,884,517 A | 3/1999 | Yogo |
| 2003/0029215 A1 | 2/2003 | Latour |
| 2013/0019463 A1* | 1/2013 | Guercioni .......... H02K 15/0421 |
| | | 29/596 |

FOREIGN PATENT DOCUMENTS

| DE | 102009025988 A1 | 12/2010 | |
| EP | 0032795 A2 | 7/1981 | |
| EP | 2710715 A2 | 3/2014 | |
| JP | 60158921 A * | 8/1985 | ............... B21D 7/08 |
| WO | 9847639 A1 | 10/1998 | |

OTHER PUBLICATIONS

International Search Report Form PCT/ISA/210, and Written Opinion Form PCT/ISA/237, International Application No. PCT/EP2019/066032 pp. 1-10 International Filing Date Jun. 18, 2019 search report dated Sep. 30, 2019.
German Exam Report, dated May 14, 2019 pp. 1-5.

\* cited by examiner

*Primary Examiner* — Livius R. Cazan
(74) *Attorney, Agent, or Firm* — George McGuire

(57) ABSTRACT

The present invention relates to a method and an apparatus for forming a hairpin-shaped winding element from a conductor.

15 Claims, 7 Drawing Sheets

A-A

B-B

C-C

METHOD AND DEVICE FOR SHAPING AN INDUCTANCE COIL

CROSS-REFERENCE TO RELATED APPLICATION

The present application is the U.S. National Stage Application of International Application No. PCT/EP2019/066032, filed Jun. 18, 2019, which relates and claims priority to German Patent Application No. 10 2018 114 580.2 filed Jun. 18, 2018, the entirety of each of which is hereby incorporated by reference.

BACKGROUND OF THE INVENTION

The invention relates to a method for forming a winding element.

Methods and devices of the type mentioned above are known to the applicant from practice. For example, in the fabrication of electric motors for traction drives, individual winding elements (plug-in coils, so-called "hairpins") are manufactured, which are further processed in the subsequent process to a stator winding. In order to achieve a higher efficiency of electric machines due to a higher degree of filling, the hairpin technology transitions from round to rectangular conductor cross sections. During the fabrication of the winding elements, corresponding conductor pieces have to be cut off from continuous material and formed to suitable winding elements. Subsequently, the winding elements are welded together after being positioned on the stator.

With a hairpin-shaped winding element, a so called hairpin (since its shape is similar to that of a hairpin), in the sense of the present application a winding element is meant, which comprises two parallel legs and a section connecting those two legs, which is in particular arc-shaped. A hairpin may in particular be U-shaped. The connecting section may in particular have a three-dimensional extension.

In prior art, the conductor pieces are usually formed into winding elements by one or more different bending stations (2D or 3D bending stations). This allows the conductor pieces to be formed into the shape required for mounting on the stator. The problem is, however, that the effort required to build such bending stations is comparatively high. In addition, conductor pieces can be formed by a bending station usually only to uniform or merely slightly different winding elements. This makes a profitable fabrication of winding elements more difficult, in particular when a large variety of shapes and small quantities of identical winding elements are required.

DE 10 2009 025 988 A1 describes a device for free-form bending of hollow profiles.

US 2003/0 029 215 A1 describes a bending device for flat wires.

WO 98/47639 A1, U.S. Pat. No. 5,884,517 A, EP 0 032 795 A and EP 2 710 715 A2 respectively describe a method having similar features the present invention.

SUMMARY OF THE INVENTION

The invention is based on the object of enabling the fabrication of winding elements with different shapes in a cost-effective manner. It is desirable that for this purpose only one apparatus is required.

The invention achieves the above mentioned object by a method for forming a preferably hairpin-shaped winding element (so-called "hairpin" or plug-in coil) from a conductor. The conductor is elongated along a longitudinal direction and has one (or more) outer surface(s) extending along the longitudinal direction. The method is characterized by several steps, which are described below.

First, the conductor is passed through a guide, wherein the guide has an outlet opening whose opening edges contact the outside of the conductor from two directions perpendicular to each other on both sides (in other words from four sides) as the conductor passes through. By contacting the conductor from the two directions perpendicular to each other on both sides, the conductor is virtually restraint-guided in the outlet opening. In other words, the conductor passes through the outlet opening in an orientation precisely determined by the contacting.

In a further step, the conductor emerging from the guide is passed through a reshaping device which preferably is located directly (in the feed direction of the conductor) downstream of the outlet opening, which reshaping device comprises a reshaping opening at whose edge or edges a plurality of reshaping sections are arranged. The reshaping sections contact the outer surface of the conductor from two opposite directions perpendicular to each other on both sides (in other words from four sides). By contacting the conductor from the two directions perpendicular to each other on both sides, the conductor is virtually restraint-guided in the reshaping opening. In other words, the conductor passes through the reshaping opening in an orientation precisely determined by the contacting.

In a further step, the conductor is reshaped by moving the conductor through the reshaping opening while simultaneously changing the orientation of the reshaping sections relative to the opening edges of the guide. Thereby, the reshaping sections (or in other words the reshaping device as a whole) are pivoted relative to the opening edges about at least one pivot axis, which is orthogonal to the feed direction, during the reshaping process and moved translationally along at least one plane whose normal vector is the pivot axis. By superimposing the pivoting movement and the translatory movement, the pivot axis of the reshaping sections is thereby shifted away from a central longitudinal axis of the conductor (central axis in its longitudinal direction). It may be additionally provided (in particular superimposed on the reshaping process just described) that the reshaping sections (or in other words the reshaping device as a whole) are pivoted relative to the opening edges about at least one pivot axis corresponding to the feed direction (twisting of the conductor) during the reshaping process. As already explained above, the conductor passes through both the outlet opening and the reshaping opening in a precisely predetermined orientation, since it is restraint-guided in the outlet opening and the reshaping opening by the respective contacting of the conductor from the two directions perpendicular to each other on both sides. By changing the orientation of the outlet opening with respect to the reshaping opening during the reshaping by pivoting, the conductor is forced to bend and, if necessary, twisted.

The proposed method has the advantage that winding elements with different shapes can be fabricated in a simple manner by passing a conductor through the guide and forming it into the desired shape by means of the reshaping device, for which purpose the reshaping sections or the reshaping device as a whole are pivoted. In order to prevent the conductor from being jammed in the reshaping device, and thus, to avoid undesired misshaping or damage to the conductor when the reshaping device is pivoted around the pivot axes oriented orthogonally to the feed direction, the reshaping device or its reshaping sections are moved in a plane whose normal vector is the pivot axis at the same time as the pivoting (compensation of the pivoting movement). In other words, on the one hand a pivoting or a rotation for the reshaping of the conductor, and on the other hand a translatory movement to compensate for the offset in the pivoting plane resulting from the pivoting movement (offset of the reshaping opening in relation to the outlet opening of the guide) are effected. When pivoting around the feed direction (torsional movement), such a translational compensation is not necessary. This method allows a high variety of winding elements with different shapes to be produced. Thus, the known bending stations can be replaced. Different winding elements can also be produced economically with only small quantities. Due to the compensation of the pivoting movement by means of a superimposed translation, the reshaping section arranged on the inside of the arc to be formed on the conductor (e.g. an inner radius to be formed) will change less in its relative position with respect to the opening edges than the opposite reshaping section or the other reshaping sections when the conductor is reshaped into an arc to be formed.

The pivoting is in particular gradually effected. The faster the conductor is pushed through the guide or the reshaping device, the faster the reshaping device or its reshaping sections can be pivoted to obtain a similar or identical curve. The higher the feed speed of the conductor, the faster the pivoting movement of the reshaping device (angular speed) can be carried out.

The guide (guiding device) guides the conductor and stabilizes it during feeding to the reshaping device and during the reshaping. The feed of the conductor from the guide to the reshaping device can be carried out by means of a handling unit, e.g. a gripper unit, a device for separating the conductor located upstream of the present device (reshaping device), which cuts the conductor, which is provided as a continuous material (reel), to length into defined conductor pieces and separates them. In this respect, the present apparatus can be a component of a larger process chain. It is also conceivable that this apparatus is used independently (stand-alone version), wherein the conductor can be advanced by means of a feed device.

The method further includes that the reshaping section on the inner side of the arc to be formed on the conductor remains unchanged in its relative position with respect to the opening edges. In other words, the pivoting movement (about a pivot axis that is orthogonal to the feed direction) of the reshaping sections is coordinated with the translational compensation movement of the reshaping sections such that the reshaping section on the inner side of the arc to be formed on the conductor remains unchanged in its relative position with respect to the opening edges. This facilitates the reshaping process of the conductor, since—seen in the feed direction—the opening cross section of the reshaping opening is changed mainly or completely on the side facing away from the reshaping ("outer side of the curve"). The "hole offset" resulting from the pivoting movement is thus largely or completely compensated. As a result, the forces generated during the reshaping process are comparatively low. The jamming tendency of the reshaping device can also be kept low.

Appropriately, the pivoting of the reshaping sections relative to the opening edges of the guide can be performed step by step or continuously. By pivoting step by step, it is possible to realize reshaping operations with a plurality of reshaping sections that may have different degrees of curvature. Continuous pivoting allows reshaping operations whose radius of curvature changes continuously (decreases or increases).

Advantageously, the reshaping sections can be pivoted relative to the opening edges of the guide simultaneously about a plurality of pivot axes, and in particular moved along a plurality of planes. Thus not only a two-dimensional reshaping of the conductor ("2D reshaping", e.g. U-shaped flat hairpin) is possible as with a pivot axis and movement in one plane, but also a three-dimensional reshaping of the conductor ("3D reshaping", e.g. a customized shape according to an individual winding diagram), so that winding elements with almost any shape can be realized.

Specifically, the conductor can have a substantially rectangular cross-section (orthogonally to the longitudinal direction). This allows winding elements for stator windings with a higher degree of filling to be achieved. Regardless of the conductor cross-section, the conductor may be a wire.

Preferably the conductor is a solid material, i.e. it does not have any cavities.

It is also conceivable that the conductor is a piece of conductor (conductor section) (no continuous material or continuous wire). Thus, the reshaping process is carried out on the already cut-off and cut-to-length conductor, i.e. on a conductor piece. The separation (cutting-off) of the conductor can be done in a process or device located upstream of the reshaping.

The conductor can be passed through in particular by means of a handling unit which is designed as a clamping-gripping feed device. This means that the feed device grips the conductor with a clamping action so that a relative movement between feed device and conductor cannot occur, and the conductor is then moved by a movement of the feed device.

Appropriately, the conductor may have an insulating sheath. This can be a coating, e.g. a varnish layer. This means that the conductor is already completely insulated, so that the reshaping of the conductor is effected together with its insulating sheath.

It is also conceivable that the conductor comprises or consists of copper or has a copper core with an insulating sheath. This makes it possible to provide a conductor with high electrical conductivity.

For further development of the method also the measures described below in connection with the apparatus can be used, which can also be read in view of a method.

The object mentioned at the beginning is also achieved by an apparatus for forming a preferably hairpin-shaped winding element (hairpin; plug-in coil) from a conductor and an apparatus is characterized by a plurality of features, which are described below.

The apparatus comprises a guide (guiding device), wherein the guide has an outlet opening, the opening edges of which are formed and arranged to contact the conductor from two directions perpendicular to each other on both sides (in other words from four sides) of its outer surface when passing through the outlet opening. The apparatus also comprises a reshaping device which is preferably arranged (in the feed direction of the conductor) directly downstream of the outlet opening and comprises a reshaping opening at the edge of which a plurality of reshaping sections are arranged. The reshaping sections are designed and arranged to contact the conductor from two directions perpendicular to each other on both sides (in other words from four sides) of its outer surface when passing through the reshaping opening. The apparatus comprises at least one pivoting device and at least one compensating device which cooperate with the reshaping device such that the reshaping sections can be pivoted relative to the edges of the opening about a pivot axis which is orthogonal to the feed direction, and can be moved translationally along a plane whose normal vector is the pivot axis, and/or the apparatus comprises at least one pivoting device which cooperates with the reshaping device such that the reshaping sections (or in other words the reshaping device as a whole) can be pivoted relative to the opening edges about at least one pivot axis which corresponds to the feed direction.

According to the invention, the apparatus comprises a first, a second and/or a third pivoting device, as well as a first and/or a second compensating device. By means of the pivoting devices a two-dimensional or a three-dimensional reshaping of the conductor can be achieved. By means of the compensating device(s), the reshaping device can be moved translationally in order to compensate for the "hole offset" resulting from the pivoting movement, as explained above.

Within the scope of a preferred design, the first pivoting device may have a first, in particular inner suspension to which the reshaping device is attached, wherein the first, in particular inner suspension is supported so as to be pivotable about a (first) pivot axis extending along the feed direction of the conductor (direction in which the conductor is moved through the guide and corresponds there to the longitudinal extension of the conductor) and can be pivoted by means of a first drive device. Thus, the conductor can be formed around the feed direction (X-direction) or longitudinal extension, e.g. a spiral section (spiral section of a winding) can be realized. Since no offset occurs during this pivoting process (rotation around the feed direction of the conductor or X-direction), no compensation device is required.

The inner suspension ("main disc") may be disc-shaped and may have a recess (partial disc). The recess provides space for the conductor, in particular when reshaping into a hairpin (in case of hairpin-shaped reshaping, the conductor "comes back"). In addition, good accessibility for maintenance or set-up work is achieved. On the inner suspension, fastening sections for the reshaping device can be formed which have fastening points (holes or passages with internal threads for screw fastening). The inner suspension can be pivotably supported by several bearings, e.g. three bearings offset by 120° with respect to the pivot axis. These bearings can be attached to the intermediate suspension as described below.

The inner suspension may have a radially protruding collar on its outer circumference, which corresponds to a groove formed in each bearing. The first drive device may have a motor, e.g. a (brushless) electric motor, which can drive the inner suspension around its pivot axis. The drive device and the inner suspension may be coupled by means of a gear connection or a helical gear. The motor shaft of the drive device and the pivot axis can be oriented parallel to each other.

Advantageously, the second pivoting device may have a second, in particular intermediate suspension, which is supported pivotably about a second pivot axis, preferably a vertical pivot axis, orthogonal to the feed direction (direction in which the conductor is moved through the guide and corresponds there to the longitudinal extension of the conductor) and can be pivoted by means of a second drive device (pivoting movement about Y-axis). This allows a reshaping of the conductor in one plane ("2D reshaping"), e.g. a horizontal plane with respect to the frame of the device. At the second, in particular intermediate suspension, in particular the first, in particular inner suspension with the attached reshaping device can be supported.

The second, in particular intermediate suspension ("second disc") may be disc-shaped and may have a recess (partial disc or flat circular ring section). The recess can be used to give the conductor space, e.g. when shaping it into a hairpin, and provides good accessibility for maintenance or set-up work. At the second, in particular intermediate suspension, bearings can be attached, e.g. by means of a screw connection, which pivotably support the inner disc ("main disc"). The first drive device for the first, in particular inner suspension may also be attached to the middle disc, e.g. by means of screw connections. The pivoting movement (rotation) of the intermediate suspension can be directly determined by the motor shaft of the second drive device.

The second drive device may have a motor, e.g. a (brushless) electric motor, wherein the second pivot axis and the central longitudinal axis of the motor shaft are congruent. The second drive device can be attached to an outer suspension as described below. The intermediate suspension can be attached to the outer suspension by means of bearing units that allow a pivoting movement around the second pivot axis. The bearing units may have a plurality of fastening sections, bolts and/or roller bearings.

In a further advantageous way, the third pivoting device may have a third, in particular outer suspension, which is supported pivotably about a third pivot axis, preferably a horizontal pivot axis, orthogonal to the feed direction (direction in which the conductor is moved through the guide and corresponds there to the longitudinal extension of the conductor) and can be pivoted by means of a third drive device (pivoting movement about the Z-axis). This allows the conductor to be reshaped in a further plane ("2D reshaping"), e.g. a plane vertical with respect to the frame of the device. Together with the second pivoting device, a three-dimensional reshaping of a conductor to a winding element is thus possible ("3D reshaping"). At the third, in particular outer suspension, in particular the intermediate suspension and the inner suspension with the attached reshaping device can be supported.

The third, in particular outer suspension may be designed as a circular ring section and may have e.g. a C-shaped cross-section ("half-moon"). The bearing units for the intermediate suspension and/or the second drive device for the intermediate suspension can be attached to the third, in particular outer suspension. The pivoting movement (rotation) of the third, in particular outer suspension can be directly determined by the motor shaft of the third drive device. The third drive device may have a motor, e.g. an electric motor, wherein the third pivot axis and the central longitudinal axis of the motor shaft of the third drive device are congruent. The third drive device may be attached to a frame, which serves as a supporting structure for the device, by means of a first compensating device and/or a second compensating device, as described below.

Within the scope of a preferred design, the reshaping device can be designed as an exchangeable tool unit. Thus, the reshaping device can be selected and adapted according to cross-section, dimensions and/or the reshaping to be carried out on the conductor. The reshaping device may have a plate-shaped holding structure (base plate) with holes/passages for attachment to the inner suspension (main plate). The reshaping device may have one or two adjustment devices for fine adjustment of the positioning of the reshaping device in the plane of the base plate (Z-Y adjustment device). For this purpose, the reshaping device may have a stop that is adjustable relative to the base plate. The stop can be adjusted and fixed relative to the base plate by means of a fixing screw. The stop may be provided with holes or passages with threads for attachment to the inner suspension (main disc). The apparatus may have a plurality of different tool units, e.g. a set of different reshaping devices can be provided with the apparatus.

Specifically, the reshaping sections of the reshaping device may each be formed by a pin or a roller. The pin or the roller may be supported by roller bearings on or in the base plate. Four pins/rollers can be provided, respective two of which are located opposite each other. Different reshaping devices can be provided for different reshaping processes. In addition, constructionally simple reshaping devices can be provided (e.g. embodiments without roller bearings) or high-quality embodiments (e.g. embodiments with roller bearings) can be provided. With a roller, it is thereby meant that the bearing for supporting the roller is located in the longitudinal area of the rotation axis of the roller, where also the contact of the roller to the conductor takes place. A pin can be rotatably supported by a bearing which is arranged along the longitudinal axis of the pin offset with respect to that location where the pin contacts the conductor.

Advantageously, a frame serving as a supporting structure can be provided, wherein the pivoting devices are coupled to the frame by means of the first compensating device and/or the second compensating device. Thus, a compensation of the pivoting movements can be effected, wherein the pivoting device(s) as a whole can be moved relative to the frame.

Within the scope of a preferred design, the first compensating device may comprise a first carriage which is movable along a first direction, in particular along a direction horizontal with respect to the frame, and which can be driven by means of a fourth drive device so that the reshaping device is movable along the pivot axis of the third pivoting device. In this way, the lateral offset relative to the conductor (offset in the Z-direction) as an effect of the pivoting movement about the Y-axis can be compensated.

Via the first compensating device and the second compensating device, the reshaping device can be translationally moved along the two pivot axes orthogonal to the feed direction.

The first carriage can be coupled to the frame by means of four linear guides (e.g. with a cage ball). Two linear guides can be attached to an upper side of the frame and two linear guides can be attached to a lower side of the frame. The first carriage can be moved by the fourth drive device. The fourth drive device may have a motor, e.g. an electric motor, and can be fixed to the frame. A spindle, e.g. a ball screw spindle, can be coupled to the motor shaft, which interacts with a nut, e.g. a spindle nut, attached to the first carriage. The motor shaft can be coupled to the spindle by means of a metal bellows coupling. The metal bellows coupling serves as a compensating element with which, for example, lateral offset and axial movements can be compensated.

Advantageously, the second compensating device may have a second carriage which can be moved along a second direction, in particular along a direction vertical with respect to the frame, and which can be driven by means of a fifth drive device so that the reshaping device can be moved along an axis orthogonal to the pivot axis of the second pivoting device. In this way, the vertical offset with respect to the conductor (offset in the Y-direction) as an effect of the pivoting movement about the Z-axis can be compensated. The second carriage can be coupled to the frame by means of a plurality of, e.g. two or four, linear guides (e.g. with a cage ball). The second carriage can be driven by the fifth drive device. The fifth drive device may have a motor, e.g. an electric motor, and can be fixed to the frame. A spindle, e.g. a ball screw spindle, can be coupled to the motor shaft, which interacts with a nut, e.g. a spindle nut, attached to the second carriage. The motor shaft can be coupled to the spindle by means of a metal bellows coupling. The metal bellows coupling serves as a compensating element with which, for example, lateral offset and axial movements can be compensated.

For further development of the apparatus, also the measures described above in connection with the method can be used, which can also be read in view of an apparatus.

The object mentioned at the beginning is also achieved by the use of a device as described above for forming a preferably hairpin-shaped winding element (hairpin; plug-in coil) from a conductor. This can be done according to one or more measures according to the method described above.

With the method according to the invention as well as the apparatus according to the invention, the opening edges may be designed and arranged to form a substantially rectangular outlet opening.

With the method according to the invention as well as the apparatus according to the invention, the reshaping sections may be designed and arranged to form a substantially rectangular reshaping opening. The reshaping sections may be arranged in pairs respectively opposite and parallel to one another, wherein the respective two pairs of reshaping sections can be offset by 90° to each other.

BRIEF DESCRIPTION OF THE DRAWINGS

The invention is described in more detail below by reference to the figures, wherein identical or functionally identical elements are provided with reference signs only once, if applicable. The figures show.

DETAILED DESCRIPTION

Figure 1:
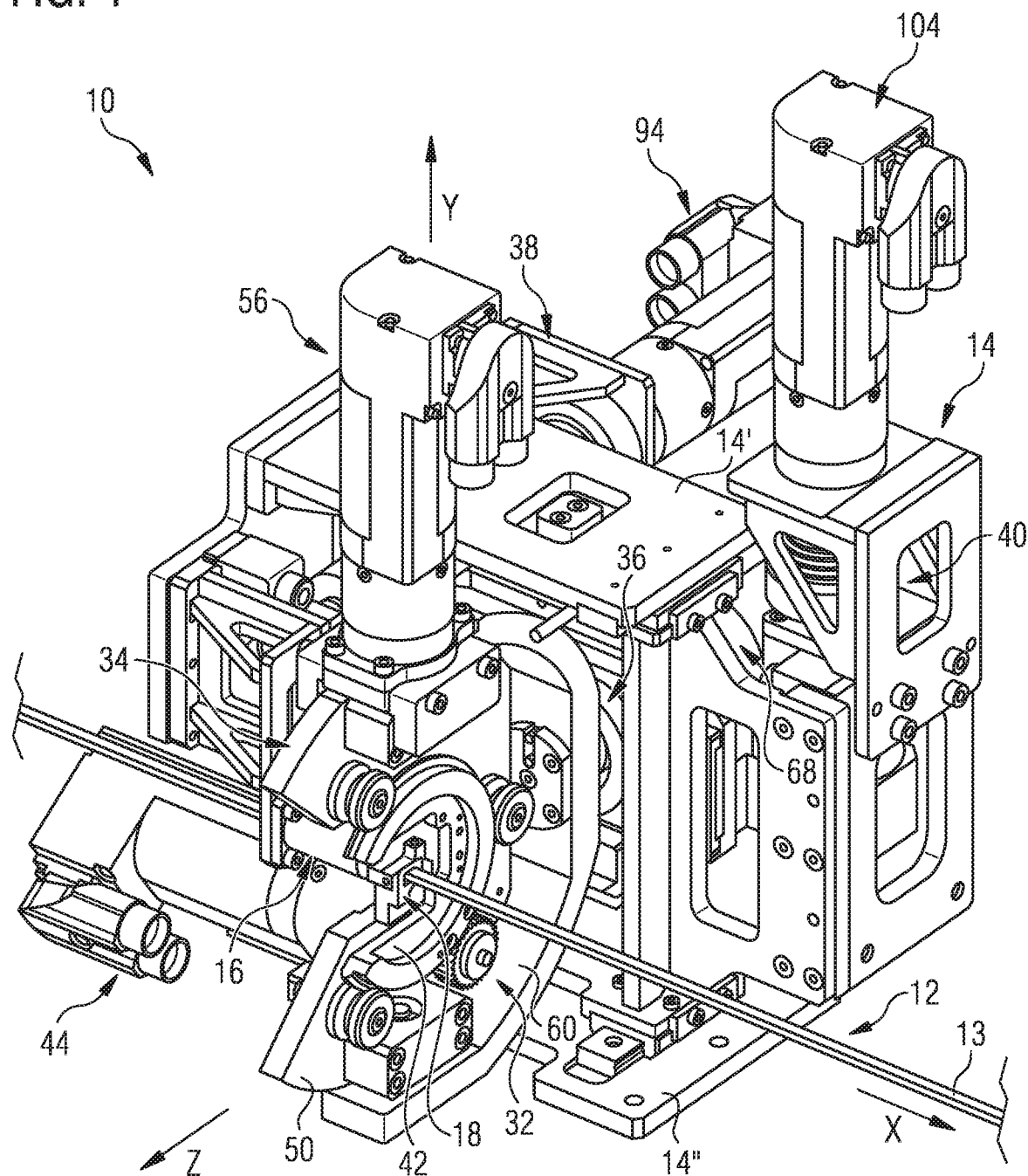
FIG. 1 an embodiment of an apparatus for forming a hairpin-shaped winding element from a conductor in a perspective front view.

FIG. 1 shows an apparatus 10 for forming e.g. a hairpin-shaped winding element from a conductor 12. The conductor 12 extends along a longitudinal direction (X-direction) and has an outer surface 13 extending along the longitudinal direction. The components of apparatus 10 are coupled or attached to a frame 14 which serves as a supporting structure.

Apparatus 10 comprises a guide 16 (partially hidden in FIG. 1) and a reshaping device 18 through which conductor 12 is guided. Reshaping device 18 can be moved relative to guide 16 by means of several pivoting devices and several compensating devices, wherein conductor 12 guided by guide 16 and reshaping device 18 can be reshaped to a hairpin-shaped winding element, for example. This is explained in detail below, with reference to the spatial axes (X-axis, Y-axis and Z-axis) drawn in FIG. 1. The X-axis extends along the longitudinal direction of conductor 12, the Y-axis extends orthogonally thereto upwards (in FIG. 1 vertically upwards) and the Z-axis extends orthogonally to the X-Y plane (in FIG. 1 diagonally downwards to the left).

Figure 7:
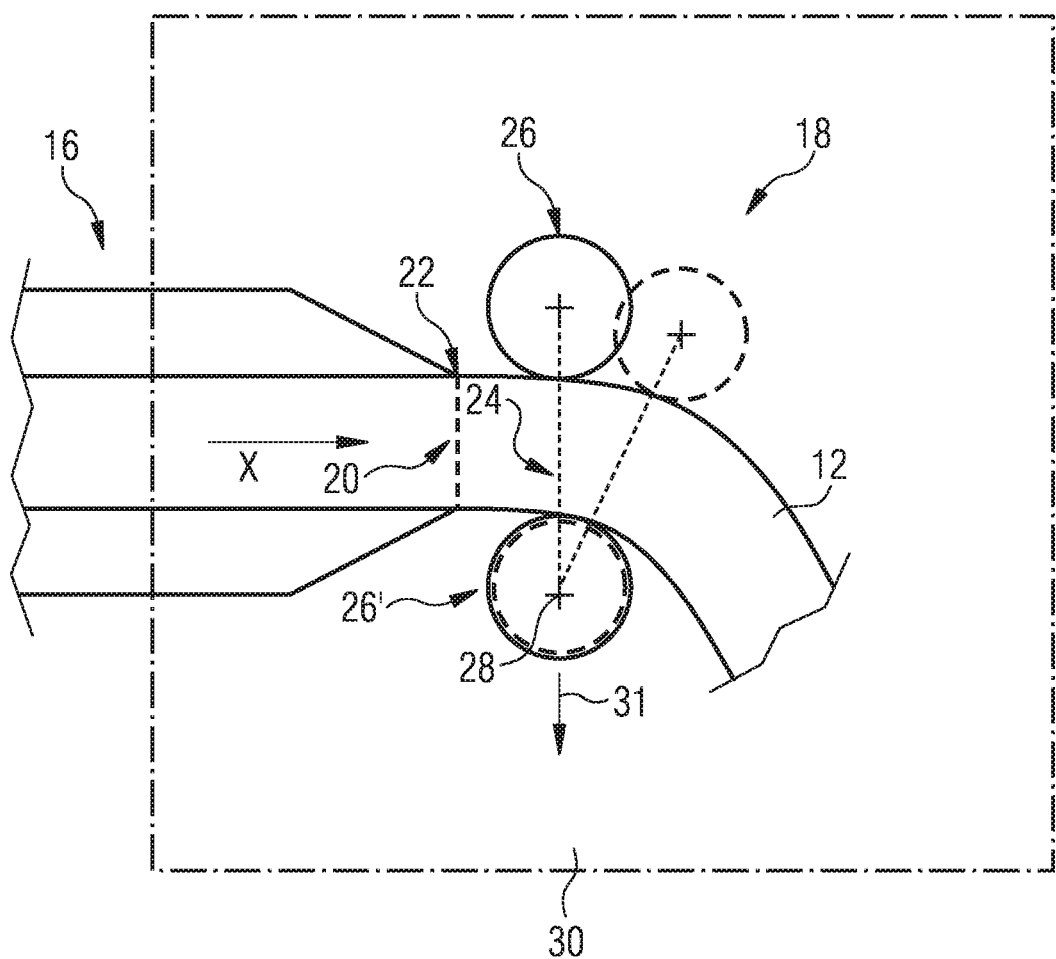
FIG. 7 a change in the orientation of the reshaping sections relative to the opening edges of the guide in a schematic diagram.

As already indicated, apparatus 10 comprises a guide 16 (partially hidden in FIG. 1) which has an outlet opening 20 (see FIG. 7). Opening edges 22 of outlet opening 20 are designed and arranged to contact conductor 12 from two directions perpendicular to each other on both sides (from four sides) when passing through outlet opening 20 (only indicated in FIG. 7).

As also previously indicated, apparatus 10 comprises a reshaping device 18 which is arranged in the feed direction of conductor 12 (X-axis) directly downstream of outlet opening 20 and comprises a reshaping opening 24. Four reshaping sections 26 are arranged at the edge or edges of reshaping opening 24, which are designed and arranged to contact conductor 12 from two directions perpendicular to each other on both sides, i.e. from four sides, on its outer surface 13 when passing through reshaping opening 24. The four reshaping sections 26 are designed and arranged such that reshaping opening 24 is substantially rectangular.

Apparatus 10 comprises at least one pivoting device and at least one compensating device which interact with reshaping device 18 such that reshaping sections 26 can be pivoted relative to opening edges 22 about at least one pivot axis 28 and can be moved along at least one plane 30 whose normal vector is pivot axis 28 (illustrated in FIG. 7).

In the embodiment, apparatus 10 comprises a first pivoting device 32, a second pivoting device 34, a third pivoting device 36, a first compensating device 38 and a second compensating device 40.

First pivoting device 32 has a first, inner suspension 42, to which reshaping device 18 is attached, e.g. screwed. Inner suspension 42 is supported pivotably about a first pivot axis (X-axis) extending along the feed direction of conductor 12 and can be pivoted by means of a first drive device 44. This allows conductor 12 to be reshaped around the feed direction (X-axis) (twisting of conductor 12 around the X-axis). Since there is no offset (central longitudinal axes of outlet opening 20 and reshaping opening 24 are congruent or are both located on the X-axis), no compensating device is required at first pivoting device 32.

Inner suspension 42 (main disk 42) is disk-shaped and has a recess 43 which is open to the side (circular ring section). Recess 43 provides space for the reshaping of conductor 12. Fastening sections 46 for reshaping device 18 are formed on inner suspension 42 and have holes or passages with internal threads for screw fixing as fixing points (without reference signs). Inner suspension 42 is held by a plurality of bearings 48 which are offset e.g. by 120° with respect to the feed direction (X-axis). These bearings 48 are attached to an intermediate suspension 50 as described below.

Inner suspension 42 has a radially protruding collar 52 on its outer circumference, which corresponds to a groove 54 respectively formed in bearings 48. First drive device 44 can have a motor, e.g. a (brushless) electric motor, which can drive inner suspension 42 around its pivot axis (X-axis). Drive device 44 and inner suspension 42 are coupled by means of a gear connection or a helical gear. The motor shaft of drive device 44 and the pivot axis (X-axis) are oriented parallel to each other.

Second pivoting device 34 has a second, intermediate suspension 50, which is supported pivotably about a second (here vertical) pivot axis (Y-axis) orthogonal to the feed direction (X-axis), and which can be pivoted by means of a second drive device 56 (pivoting movement about the Y-axis). Thus, a reshaping of the conductor in one plane is possible ("2D reshaping", i.e. reshaping to a flat hairpin).

Inner suspension 42 with attached reshaping device 18 are supported on intermediate suspension 50. Intermediate suspension 50 (second disc 50) is disc-shaped and has a recess 58 (flat circular ring section). Recess 58 provides space for the reshaping of conductor 12. Bearings 48 are respectively attached to intermediate suspension 50 by means of a screw connection. First drive device 44 for inner suspension 42 is also attached to intermediate disk 50, e.g. by means of screw connections.

The pivoting movement (rotation) of intermediate suspension 50 is directly determined by the motor shaft (without reference sign) of second drive device 56. Second drive device 56 has a motor, e.g. a (brushless) electric motor, wherein the second pivot axis (Y-axis) and the central longitudinal axis of the motor shaft are congruent. Second drive device 56 is attached to an outer suspension 60 as described below. Intermediate suspension 50 is attached to outer an suspension 60 by means of bearing units 62, which enable a pivoting movement around the second pivot axis (Y-axis). Bearing units 62 have a plurality of fastening sections 64, bolts 66 and roller bearings (not shown).

Third pivoting device 36 has a third, outer suspension 60, which is supported pivotably about a third (here vertical) pivot axis (Z-axis) orthogonal to the feed direction, and which can be pivoted by means of a third drive device 68 (pivoting movement about the Z-axis). Thus, a reshaping of conductor 12 in a further plane is possible ("2D reshaping"), e.g. in a plane (X-Y plane) vertical with respect to frame 14 of apparatus 10. Together with second pivoting device 34, a three-dimensional reshaping of conductor 12 to a winding element is thus possible ("3D reshaping").

On outer suspension 60, intermediate suspension 50 and inner suspension 42 with the attached reshaping device 18 are mounted. Outer suspension 60 is designed as a circular ring section and has a C-shaped cross-section. Bearing units 62 and second drive device 56 for intermediate suspension 50 are attached to outer suspension 60.

The pivoting movement (rotation) of outer suspension 60 is directly determined by the motor shaft (without reference sign) of third drive device 68. Third drive device 68 has a motor, e.g. a (brushless) electric motor, wherein the third pivot axis (Z-axis) and the central longitudinal axis of the motor shaft of third drive device 68 are congruent. Third drive device 68 is attached to frame 14 by means of first compensating device 38 and/or second compensating device 40, as described below.

Figure 4A:
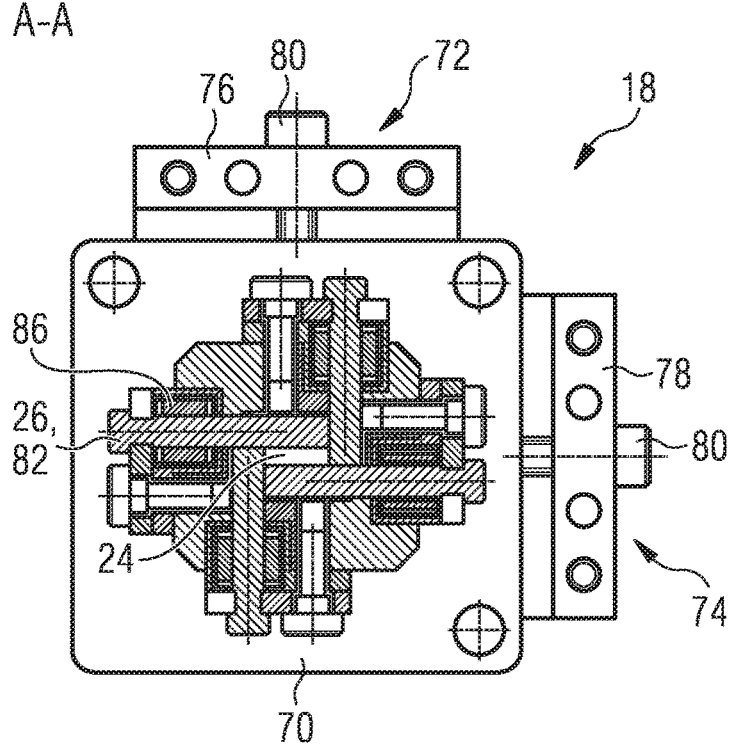
FIG. 4a-c an embodiment of a reshaping device of the apparatus of FIG. 1 in several views.
Figure 4B:
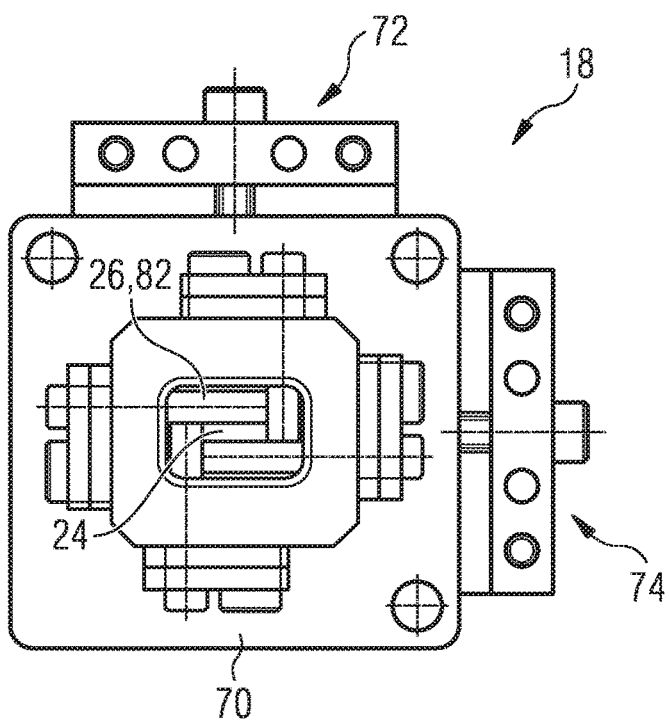
Figure 4C:
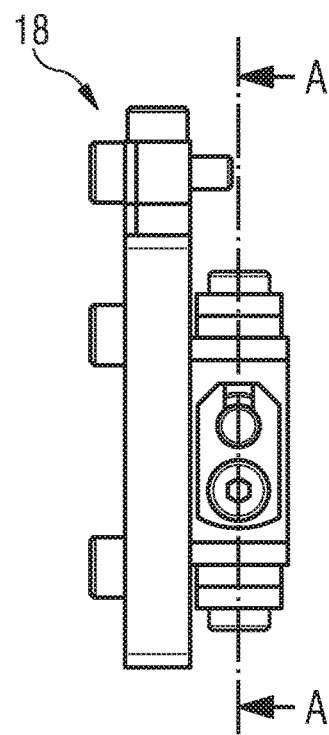
Figure 5A:
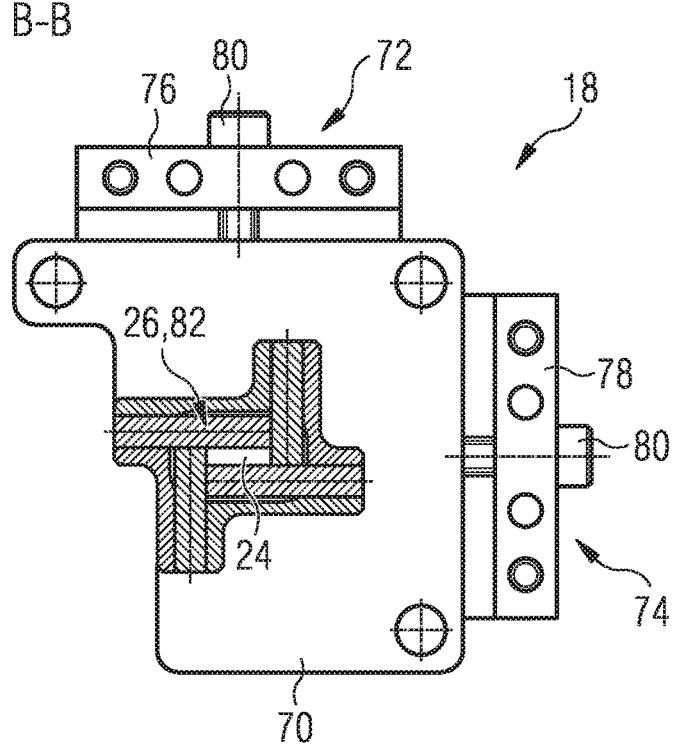
FIG. 5a-c an embodiment of a reshaping device of the apparatus of FIG. 1 in several views.
Figure 5B:
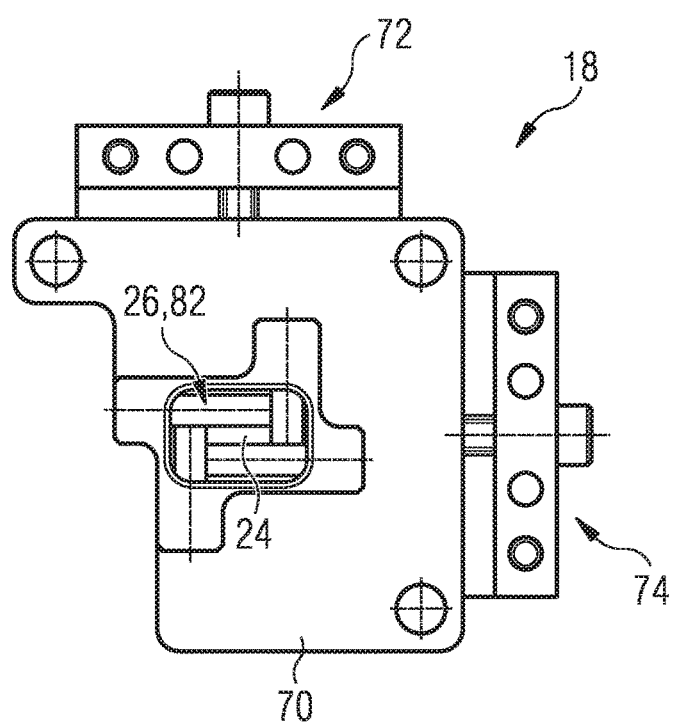
Figure 5C:
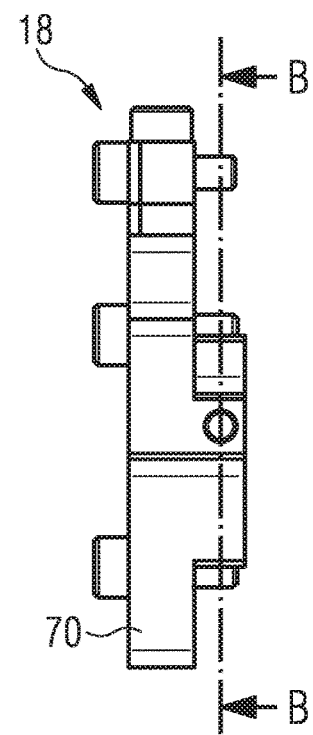
Figure 6A:
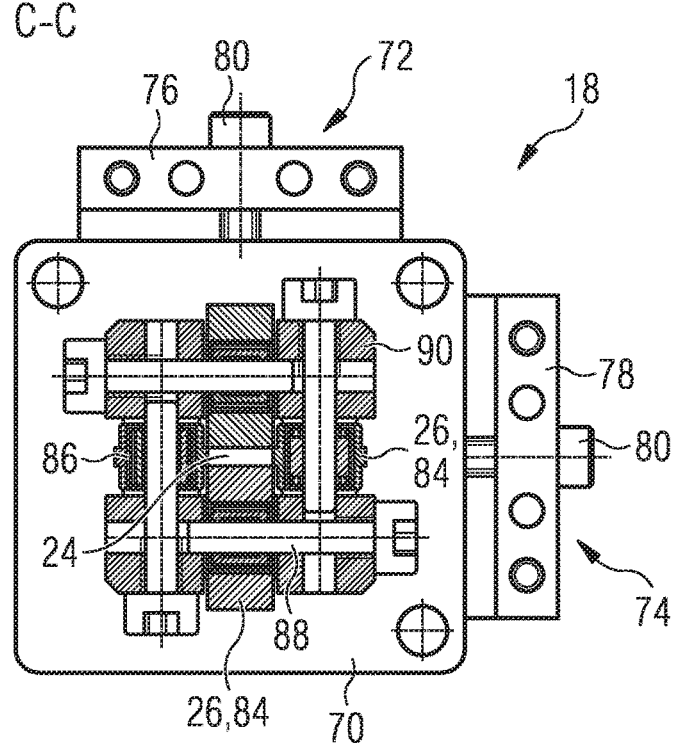
FIG. 6a-c an embodiment of a reshaping device of the apparatus of FIG. 1 in several views.
Figure 6B:
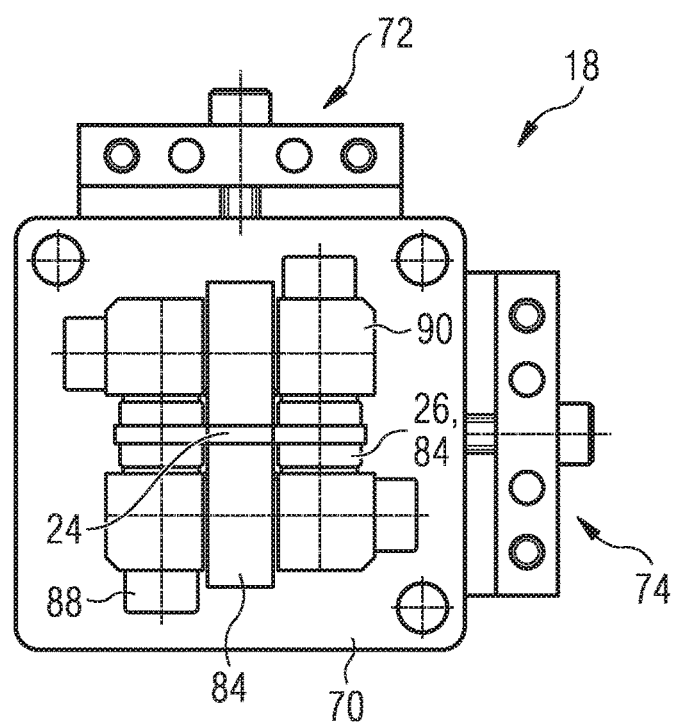
Figure 6C:
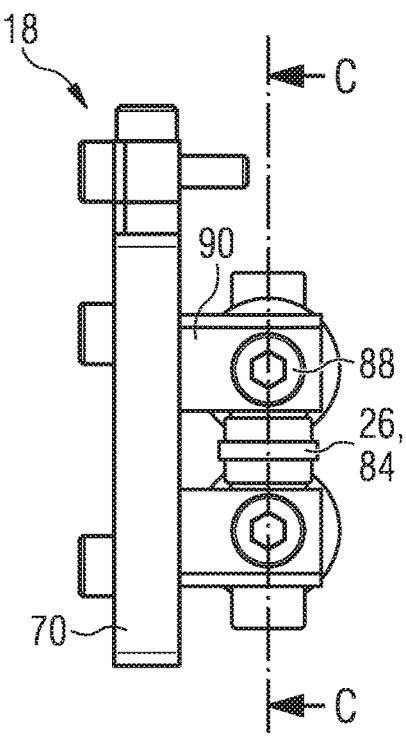

Reshaping device 18 is designed as an exchangeable tool unit (see FIGS. 4 to 6). This allows the appropriate reshaping device 18 to be selected and adapted to the reshaping process.

Reshaping device 18 has a plate-shaped supporting structure 70 (base plate 70) with holes/passages for attachment to inner suspension 42. Reshaping device 18 has two adjusting devices 72, 74 for fine adjustment of reshaping device 18 in the plane of base plate 70. For this purpose, reshaping device 18 has stops 76, 78 adjustable relative to the base plate 18. Stops 76, 78 can each be adjusted and fixed relative to base plate 70 by means of a fixing screw 80. Stop 76, 78 may have holes or passages with threads for attachment to inner suspension 42 (without reference sign). Apparatus 10 may comprise a plurality of different reshaping devices 18 or tool units, e.g. a set of different reshaping devices 18 can be provided with apparatus 10.

Reshaping sections 26 of reshaping device 18 are each formed by a pin 82 or by a roller 84, which can optionally be supported on reshaping device 18 by means of a roller bearing 86. Due to the rectangular cross-sectional shape of conductor 12, four reshaping sections 26 are respectively provided.

To provide a structurally simple reshaping device 18, pins 82 (without roller bearings) can be attached to or in base plate 70 (see FIG. 5). If conductor 12 is passed through reshaping opening 24, pins 82 do not or do only slightly co-rotate. Solutions of higher constructional quality can be achieved by designs having roller bearings. For example, pins 82 can be mounted on or in base plate 70 by means of roller bearings 86 (see FIG. 4*a*). Rollers 84 can also be mounted on or in base plate 70 by means of roller bearings 86 (see FIG. 6*a*). Rollers 84 and roller bearings 86 can be attached to bearing blocks 90, which are attached to base plate 70, using bolts 88.

As already indicated, apparatus 10 comprises a frame 14 as a supporting structure, wherein third pivoting device 36 is coupled to frame 14 by means of first compensating device 38 and second compensating device 40.

First compensating device 38 has a first carriage 92 which can be moved along a direction horizontal with respect to frame 14 and which can be driven by a fourth drive device 94 so that reshaping device 18 can be moved along the pivot axis of the third pivoting device (Z-axis). In this way, the lateral offset relative to conductor 12 (offset in the Z-direction) as an effect of the pivoting movement about the Y-axis can be compensated.

First carriage 92 can be coupled to frame 14 by four linear guides 96 (e.g. with cage ball). Two linear guides 96 are attached to an upper frame section 14' and two linear guides 96 are attached to a lower frame section 14". First carriage 92 can be moved along linear guides 96 by fourth drive device 94. Fourth drive device 96 may have a motor, e.g. a (brushless) electric motor, and may be fixed to frame 14. A spindle 98 (ball screw spindle 98) is coupled to the motor shaft, which interacts with a nut (spindle nut; not shown) attached to first carriage 92. The motor shaft of fourth drive device 96 is coupled to spindle 98 by means of a metal bellows coupling 100.

Second compensating device 40 has a second carriage 102 which can be moved along a direction vertical with respect to frame 14, and which can be driven by means of a fifth drive device 104 so that reshaping device 18 can be moved along an axis (Y-axis) orthogonal to the pivot axis of third pivoting device 36 (Z-axis). In this way, the vertical offset with respect to conductor 12 (offset in the Y-direction) as an effect of the pivoting movement about the Z-axis can be compensated.

Second carriage 102 is coupled to frame 14 by two linear guides 106 (e.g. with cage ball). Second carriage 102 can be driven along linear guides 106 by means of fifth drive device 104. Fifth drive device 104 has a motor, e.g. a (brushless) electric motor, and is fixed to frame 14. A spindle 108 (ball screw spindle 108) is coupled to the motor shaft of fifth drive device 104, which interacts with a nut (spindle nut; not shown) attached to second carriage 102. The motor shaft is coupled to spindle 108 by means of a metal bellows coupling 110.

The method for forming a preferably hairpin-shaped winding element (hairpin; plug-in coil) from a conductor 12 which is formed to be elongated along a longitudinal direction (X-axis) and has an outer surface 13 extending along the longitudinal direction, works as follows:

First, conductor 12 is passed through guide 16, wherein guide 16 has an outlet opening 20, opening edges 22 of which contact the outer surface 13 of the conductor from two directions perpendicular to each other on both sides (from four sides) when conductor 12 passes through.

Subsequently, conductor 12 exiting guide 16 is passed through a reshaping device 18 (in the feed direction of conductor 12) which is located directly downstream of outlet opening 20 and comprises a reshaping opening 24 at whose edge or edges a plurality of reshaping sections 26 are arranged. Reshaping sections 26 contact the outer surface 13 of conductor 12 from two directions perpendicular to each other on both sides (from four sides).

Subsequently, conductor 12 is reshaped by moving conductor 12 through reshaping opening 24 while simultaneously changing the orientation of reshaping sections 26 relative to opening edges 22 of guide 20. During the reshaping process, reshaping sections 26 (or in other words reshaping device 18 as a whole) are pivoted relative to opening edges 22 about at least one pivot axis 28 and are moved along at least one plane 30 whose normal vector is pivot axis 28.

When changing the orientation of reshaping sections 26 relative to opening edges 22 of guide 16, reshaping section 26 on the inner side of the arc to be formed on conductor 12 (inner radius) is changed less in its relative position with respect to opening edges 22 of guide 16 than the other reshaping sections, and preferably remains in its relative position with respect to opening edges 22. This practically compensates for the "hole offset" resulting from the pivoting movement.

This aspect is illustrated in FIG. 7. The starting position of reshaping device 18 or reshaping sections 26 (passing conductor 12 would not undergo any reshaping) is drawn in FIG. 7 with solid lines. A possible reshaping position of reshaping device 18 or reshaping sections 26 (passing conductor 12 is reshaped as shown) is drawn with dotted lines. If the orientation of reshaping device 18 relative to opening edges 22 starting from the starting position (solid lines) was carried out without compensation of the hole offset, reshaping device 18 would be pivoted about a pivot axis centrally intersecting conductor 12, which would result in conductor 12 being stressed by reshaping sections 26 from two opposite sides (not shown).

To avoid this, reshaping device 18 is not only pivoted, but is also moved translationally in pivoting plane 30, whose normal vector is pivot axis 28, towards the inner side (inner radius) of the reshaping operation (illustrated by arrow 31). This is effected such that reshaping section 26' located on the inner side of the arc does not change its relative position with respect to opening edges 22 during the reshaping process or only changes it in a negligible way. The superimposed pivoting movement and translational compensation movement are thus virtually coordinated with each other, in particular such that reshaping section 26' does not execute any relative movement with respect to opening edges 22 when pivoting.

The pivoting of reshaping sections 26 relative to opening edges 22 of guide 16 can be performed step by step or continuously, as explained above.

Reshaping sections 26 can be pivoted about a plurality of pivot axes and can be moved simultaneously along a plurality of planes relative to opening edges 22 of guide 16. This allows not only a two-dimensional, but also a three-dimensional reshaping of a conductor 12 to a winding element, as shown above. A superimposed compensation of two translational compensatory movements can, for example, be carried out such that the center of the part of the reshaping sections 26 contacting the conductor does not perform any relative movement.

Figure 2:
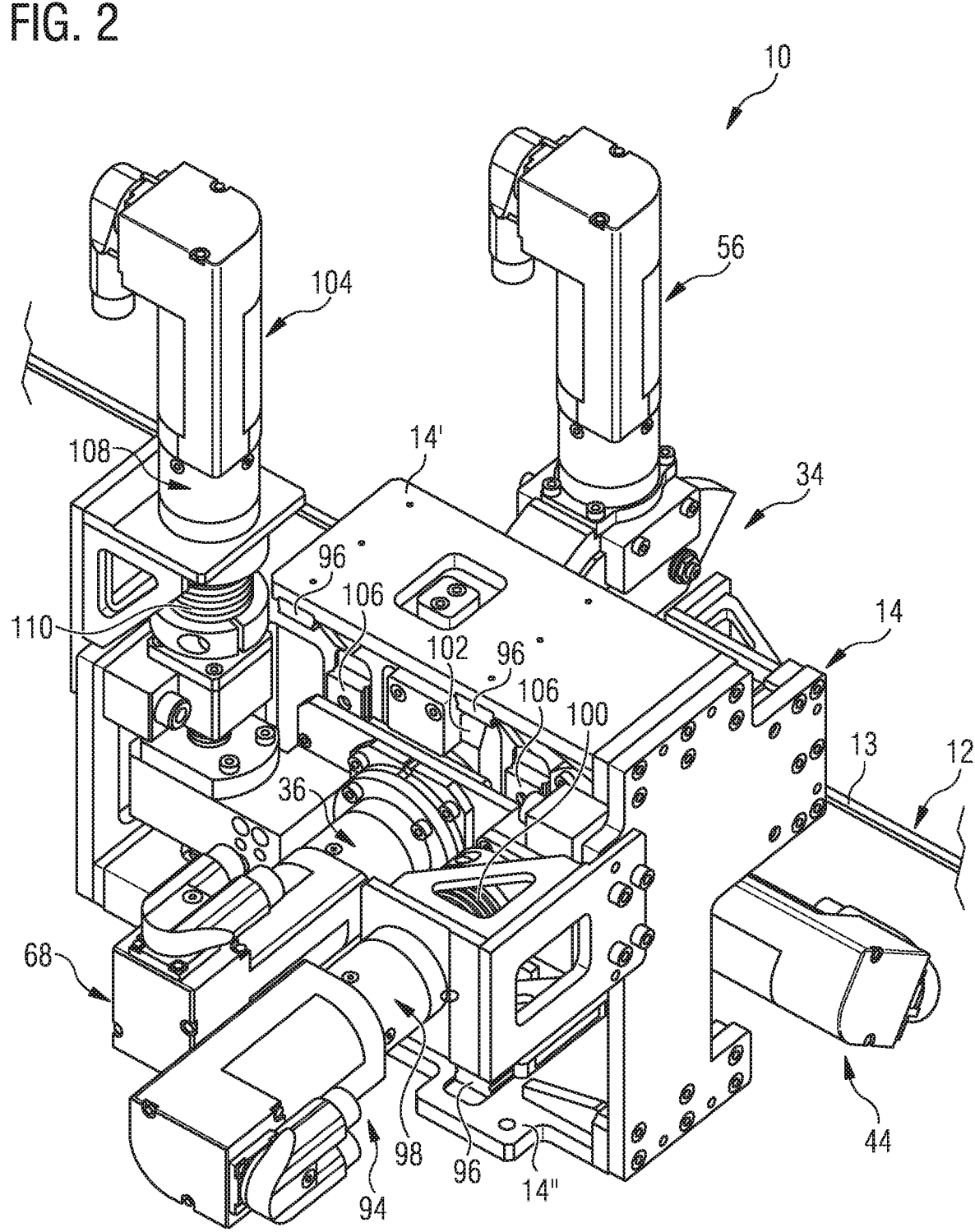
FIG. 2 the apparatus of FIG. 1 in a perspective rear view.
Figure 3:
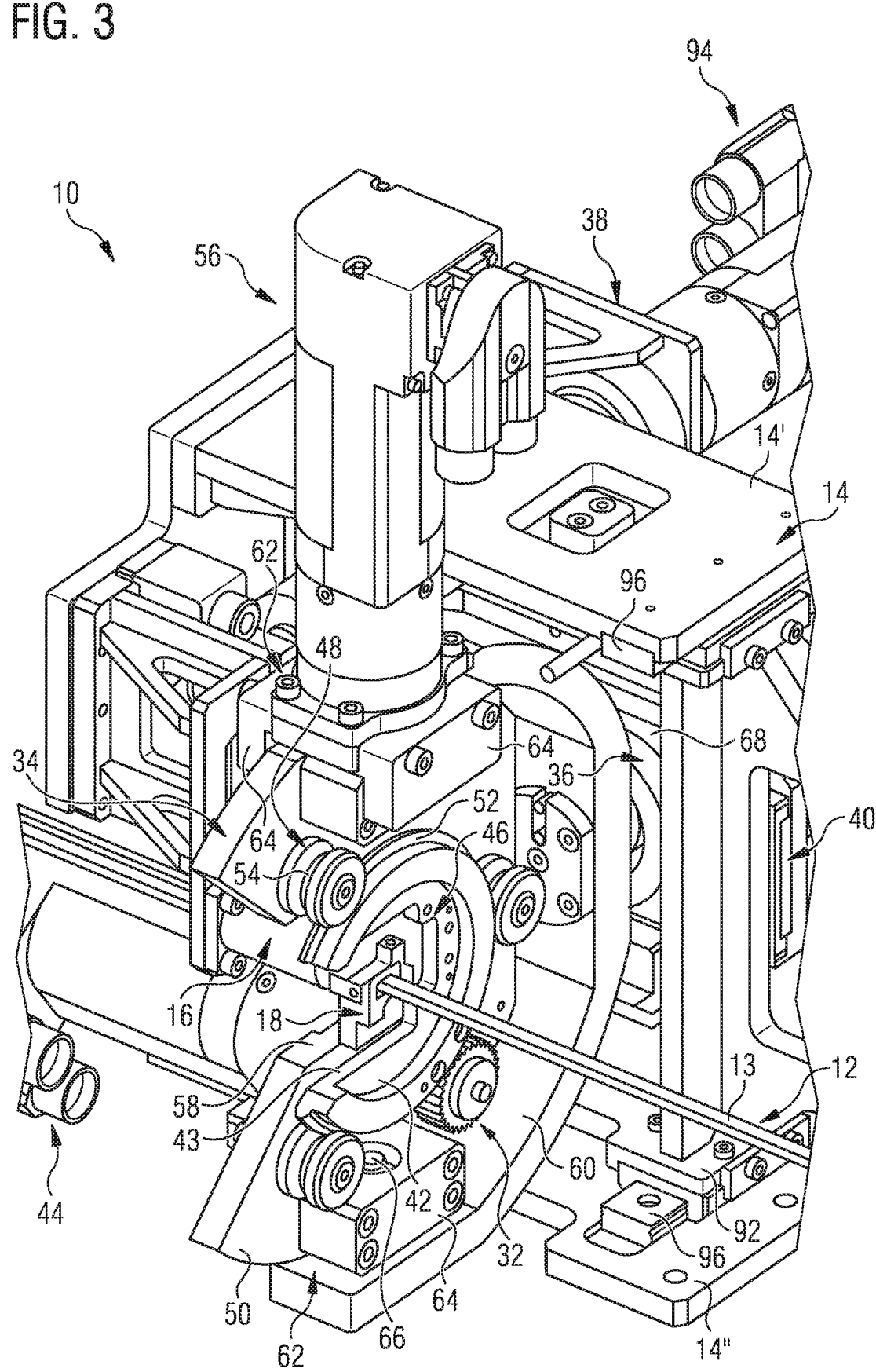
FIG. 3 the apparatus of FIG. 1 in a partial and enlarged front view.

Conductor 12 has a substantially rectangular cross-section (orthogonal to the longitudinal direction; X-axis). Conductor 12 is a wire. Although shown differently in FIGS. 1 and 2 for reasons of understanding, conductor 12 is a conductor piece or a conductor section (not a continuous material or continuous wire).

Conductor 12 has an insulating sheath. This is a coating, e.g. a varnish layer. Thus, conductor 12 is already completely insulated, so that the reshaping of conductor 12 is effected together with its insulating sheath.

Conductor 12 can comprise copper or can consist of copper or can have a copper core with an insulating sheath.

The invention claimed is:

1. A method for forming a hairpin-shaped winding element from a conductor, wherein the conductor is formed to be elongated along a longitudinal direction and has an outer surface extending along the longitudinal direction, characterized by the following steps:
   passing the conductor through a guide in a feed direction corresponding to the longitudinal direction of the conductor, wherein the guide has an outlet opening, the opening edges of which contact the outer surface of the conductor from two directions perpendicular to each other on both sides when the conductor passes through;
   passing the conductor emerging from the guide through a reshaping device which is located downstream of the outlet opening and comprises a reshaping opening, on the edge of which a plurality of reshaping sections are arranged, wherein the reshaping sections contact the outer surface of the conductor from two directions perpendicular to one another on both sides; and
   reshaping the conductor by moving the conductor through the reshaping opening while simultaneously changing the orientation of the reshaping sections relative to the opening edges of the guide, wherein the reshaping sections are pivoted during the reshaping process relative to the opening edges about at least one pivot axis which extends orthogonally to the feed direction, and are simultaneously moved translationally along at least one plane that extends orthogonally to the at least one pivot axis, wherein, during this pivoting movement with superimposed translatory movement of the reshaping sections relative to the opening edges of the guide, the reshaping section disposed on an inner side of an arc to be formed on the conductor is changed less in its relative position with respect to the opening edges of the guide than the opposite reshaping section disposed on an outer side of the arc to be formed and remains unchanged in its relative position with respect to opening edges, wherein during the reshaping process the reshaping sections are additionally pivoted relative to the opening edges about at least one pivot axis which corresponds to the feed direction, in order to twist the conductor.

2. The method according to claim 1, characterized in that the pivoting of the reshaping sections relative to the opening edges of the guide is effected step by step or continuously.

3. The method according to claim 1, characterized in that the reshaping sections are pivoted relative to the opening edges of the guide simultaneously or successively about a plurality of pivot axes, and are moved along a plurality of planes.

4. The method according to claim 1, characterized in that the conductor has a substantially rectangular cross-section and/or that the conductor is a wire.

5. The method according to claim 1, characterized in that the conductor is a conductor piece or a conductor section.

6. The method according to claim 1, characterized in that the conductor has an insulating sheath.

7. The method according to claim 1, characterized in that the conductor comprises or consists of copper or has a copper core with an insulating sheath.

8. An apparatus for forming a hairpin-shaped winding element from a conductor, comprising a guide, wherein the guide has an outlet opening, the opening edges of which are formed and arranged to contact the conductor from two directions perpendicular to each other on both sides of its outer surface when passing through the outlet opening; a reshaping device, which is arranged downstream of the outlet opening and comprises a reshaping opening, at the edge of which a plurality of reshaping sections are arranged, wherein the reshaping sections are formed and arranged to contact the conductor on its outer surface from two directions perpendicular to one another on both sides when passing through the reshaping opening; wherein the apparatus comprises at least a second and/or a third pivoting device and at least a first and/or a second compensating device which cooperate with the reshaping device such that the reshaping sections can be pivoted relative to the opening edges about at least one pivot axis which is orthogonal to the feed direction, and can be moved translationally along at least one plane that extends orthogonally to the at least one pivot axis, wherein the apparatus comprises at least a first pivoting device which cooperates with the reshaping device such that the reshaping sections can be pivoted relative to the opening edges about at least one pivot axis which corresponds to the feed direction, and wherein the first pivoting device has an inner suspension to which the reshaping device is attached, characterized in that a first, inner suspension is supported pivotably about a pivot axis extending along the feed direction of the conductor and can be pivoted by means of a first drive device, and wherein the inner suspension is disc-shaped and has a recess which is open to the side.

9. The apparatus according to claim 8, characterized in that the second pivoting device has a second suspension, which is supported pivotably about a second pivot axis orthogonal to the feed direction, and can be pivoted by means of a second drive device.

10. The apparatus according to claim 8, characterized in that the third pivoting device has a third suspension which is supported pivotably about a third pivot axis orthogonal to the feed direction, and can be pivoted by means of a third drive device.

11. The apparatus according to claim 8, characterized in that the reshaping device is designed as an exchangeable tool unit.

12. The apparatus according to claim 8, characterized in that the reshaping sections of the reshaping device are each formed by a pin or by a roller.

13. The apparatus according to claim 8, characterized in that a frame serving as a supporting structure is provided, wherein the third pivoting device is coupled to the frame by means of the first compensating device and/or the second compensating device.

14. The apparatus according to claim 8, characterized in that the first compensating device comprises a first carriage which is movable along a first direction horizontal with respect to the frame, and which can be driven by means of a fourth drive device so that the reshaping device is movable along the pivot axis of the third pivoting device.

15. The apparatus according to claim 8, characterized in that the second compensating device comprises a second carriage which is movable along a second direction vertical with respect to the frame, and which can be driven by means of a fifth drive device so that the reshaping device is movable along an axis orthogonal to the pivot axis of the third pivoting device.

\* \* \* \* \*